United States Patent [19]
Hill

[11] 3,826,929
[45] July 30, 1974

[54] GAIN STABILIZED SIGNAL PROCESSING CIRCUITRY FOR GROUND RESISTANCE SENSOR

[75] Inventor: Charles E. Hill, Lynn, Ind.

[73] Assignee: Avco Corporation, Richmond, Ind.

[22] Filed: June 11, 1973

[21] Appl. No.: 368,795

[52] U.S. Cl............... 307/308, 102/70.2, 307/274, 307/297, 328/5, 340/258 C
[51] Int. Cl. ......................................... H03k 17/00
[58] Field of Search .......... 307/308, 309, 310, 297, 307/274; 328/1-6; 340/258 C; 331/65; 102/70.2

[56] References Cited
UNITED STATES PATENTS
3,572,109   3/1971   Yerman ............................... 331/65
3,754,508   8/1973   Dalton .......................... 102/70.2 R Primary Examiner—Rudolph V. Rolinec
Assistant Examiner—B. P. Davis
Attorney, Agent, or Firm—Irwin P. Garfinkle; Charles M. Hogan

[57] ABSTRACT

To detect whether an area is being intruded, a bare wire resistance sensor is placed on the surface of the earth and the change in resistance between the bare wire and earth is used to detect an intrusion. Circuitry is provided for maintaining a constant voltage drop across the ground resistance in spite of slow variations in resistance, while at the same time permitting the sensing of rapid changes. Spurious signals, which may result in false alarms, are attenuated by low pass filters in a succeeding AC amplifier.

12 Claims, 4 Drawing Figures

3,826,929

GAIN STABILIZED SIGNAL PROCESSING CIRCUITRY FOR GROUND RESISTANCE SENSOR

BACKGROUND OF THE INVENTION

The use of the phenomenon of ground resistance variations to detect the intrusion of personnel or vehicles is disclosed in Dalton's U.S. patent application Ser. No. 131,219 filed Apr. 5, 1971, and entitled "Sensor Employing a Resistance Variation Detection System." Dalton taught the concept of placing a bare wire on the earth and using the change in the resistance between the wire and earth as an indication of any change in existing conditions. The Dalton arrangement, while performing satisfactorily under various conditions, sometimes gave false alarms resulting from changes in resistance due to wind, rain or snow, as well as from changes in the characteristics in the bare wire sensor per se, and from electric ground currents. Furthermore, the circuit disclosed therein did not function effectively over the entire resistance range experienced under actual operating conditions. This invention provides a circuit for overcoming the various deficiencies of Dalton's arrangement, and for providing a system which will respond only to changes in the resistance to ground which are characteristic of the effects of an intrusion.

SUMMARY OF THE INVENTION

The invention utilizes a resistance sensor wire laid on the ground for detecting an intrusion into the area where the sensor is placed. The resistance between the wire and ground provides the inputs to two amplifying networks. One network, operating on the voltage change across the resistance to ground, provides an output for a utilization circuit such as a warning device. The other network is a closed loop system for maintaining the voltage across the resistance to ground substantially constant in spite of slow variations in the resistance.

The resistance to ground of the sensor wire can vary from a few thousand ohms to several hundred megohms or more. Optimum system operation is achieved if the voltage maintained on the sensor wire is held constant regardless of its absolute resistance to ground so long as the rate of change in resistance is below a predetermined level. If this criteria is met, the same signal voltage will be generated for a given percentage change in the sensor wire to ground resistance, regardless of the nominal resistance value, providing the rate of change in resistance is above the predetermined level so that the current remains constant. If this criteria is not met, the sensitivity of the system then becomes a function of the nominal ground resistance value. Since the nominal ground resistance value can change by several orders of magnitude, the system sensitivity to disturbances would also vary widely.

In addition to maintaining a substantially constant sensitivity regardless of the initial ground resistance, the system also has the capability of differentiating between a valid disturbance signature and environmental noise disturbances caused by wind, rain or snow, as well as ground currents. For high sensor resistances a capacity change between the sensor wire and ground may serve to generate a valid disturbance signature.

THE DRAWINGS

Description of the Invention

Figure 3:
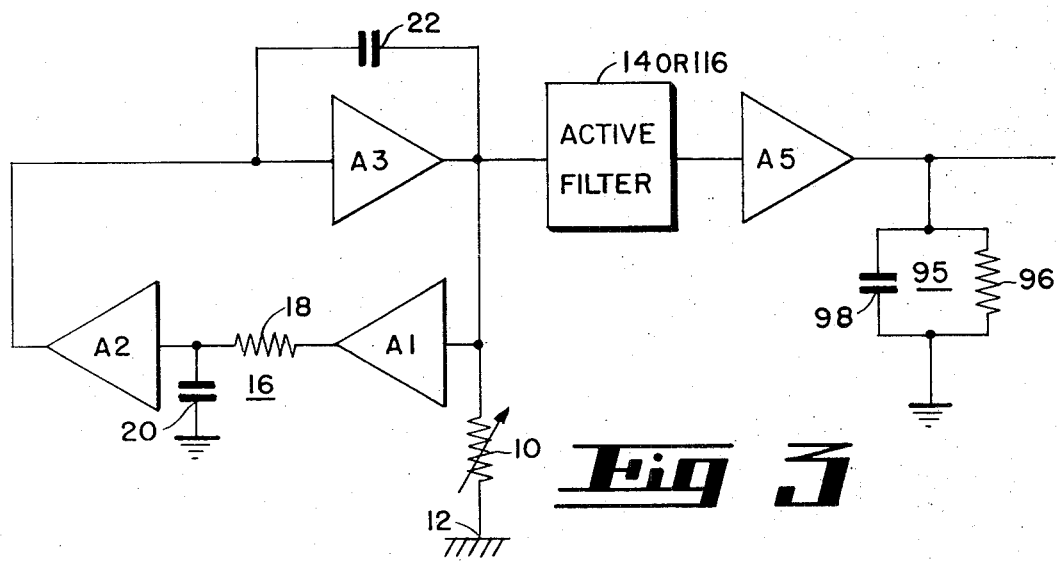
FIG. 3 is a block diagram showing the overall system.

Referring first to FIG. 3, a variable resistance sensor 10 represents the resistance to earth of a wire sensor placed on the earth represented by a ground 12. Sensor 10 furthermore represents the input impedance to ground 12 of an amplifier A1, and also the input impedance to an active filter 14 or 116 for a utilization circuit. The variable resistance sensor 10 comprises the resistance of a bare wire sensor combined with the ground to circuit return resistance plus the variable impedance of the sensor contact with the earth, generally connected in series. Usually the series resistances are negligible compared to the sensor contact resistance to ground. If, due to environmental changes such as wind, rain or snow, the resistance of sensor 10 increases or decreases gradually, it is required that the voltage across it be maintained constant since the voltage across sensor 10 is also the input to the active filters 14 or 116. Additionally, the voltage across the sensor 10 must be maintained constant to insure a substantially constant sensitivity to sudden changes in sensor impedance regardless of the initial impedance. This is done by increasing or decreasing the current supplied to sensor 10 to compensate for the resistance change. Any change in resistance of sensor 10 results in a change of input voltage to amplifier A1 and this voltage is applied through a low pass filter 16, comprised of resistor 18 and capacitor 20, to an amplifier A2. The output from amplifier A2 is used to control the bias voltage of an amplifier A3. The degenerative coupling of the amplifiers will serve to maintain the voltage across the sensor substantially constant for relatively slow changes in resistance. Capacitor 22 connected across the amplifier A3 is used to disable the control loop in order to detect a transient or sudden disturbance of the resistance of the sensor. The low pass filter 16 inserted between amplifier A2 and amplifier A3 further helps to disable the control loop when subjected to a sudden resistance disturbance. This permits the generation of a voltage change across the sensor 10 and the application of such voltage change through the active filter 14 or 116 followed by an amplifier A5, and a low pass filter to a utilization circuit (not shown). The filter 95, consisting of parallel connected resistor 96 and capacitor 98, serves to filter out unwanted high frequency components.

Figure 1:
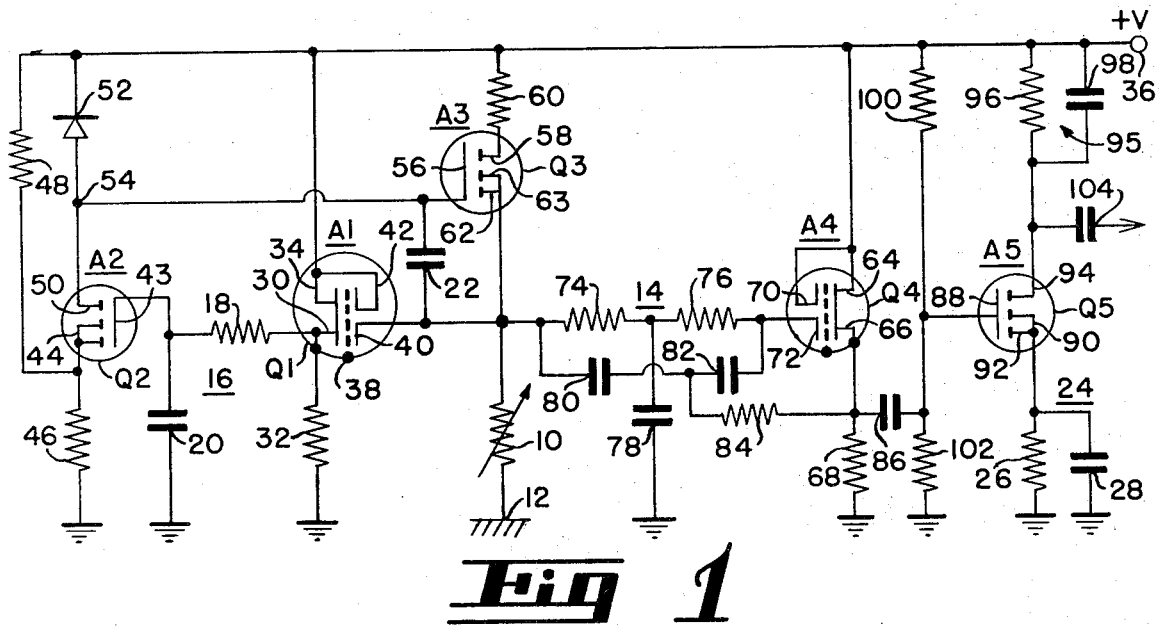
FIG. 1 is a schematic representation of one form of this invention.
Figure 2:
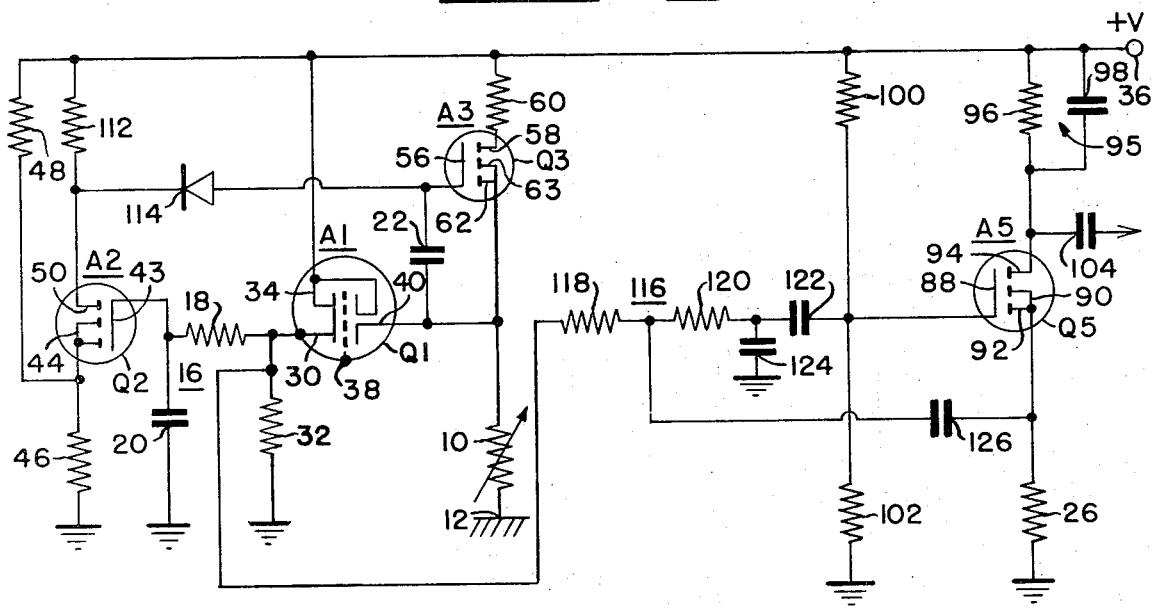
FIG. 2 is a schematic representation of another form of this invention.

The details of the system illustrated in FIG. 3 are shown in the embodiments of FIGS. 1 and 2.

THE EMBODIMENT OF FIG. 1

As seen in FIG. 1, the resistance to ground of the resistance sensor 10 provides the input both to the amplifier A1 and the amplifier A4. The amplifier A1 comprises a field effect transistor Q1 having its source electrode 30 connected to ground through a resistor 32, its drain electrode 34 connected directly to a +V power supply terminal 36, a substrate 38 and case are connected directly to the source electrode 30, and first and second gate electrodes 40 and 42. Gate electrode 42 is connected directly to the drain electrode 34 while the gate electrode 40 is connected to ground through resistance sensor 10. The FET transistor Q1 operates as a source follower having its output voltage developed across the resistor 32 so that variations in the input voltage appearing across the sensor 10 are developed across the resistor 32.

The output from amplifier A1 is applied to the low pass filter 16 comprised of the resistor 18 and capacitor 20, so that only the low frequency currents are applied to the gate electrode 43 of a field effect transistor Q2 in amplifier A2. The source electrode 44 and substrate 36 of the field effect transistor Q2 are connected to the junction of bias resistors 46 and 48 connected between the +V power supply terminal 36 and ground. The drain electrode 50 is connected to the power supply terminal 36 through an inverted diode 52, acting as a very high resistance.

The output from amplifier A2 is derived from the junction 54 between the drain electrode 50 and the diode 52, and is applied to the gate electrode 56 of a field effect transistor Q3. The drain electrode 58 of field effect transistor Q3 is connected to the +V voltage supply terminal 36 through a resistor 60 while its source electrode 62 and substrate 63 are connected to ground through the sensor resistance 10. The capacitor 22 is connected between the gate and source electrodes 56 and 62 of transistor Q3.

The voltage across resistor 10 must normally remain constant in spite of low frequency variations due to environmental changes. The changes occur generally at a frequency of less than 1 hz. Therefore, if the resistance of the sensor 10 should slowly decrease, the current through the sensor should be slowly increased to maintain a constant voltage level. This means that the amplifier A3 must provide increased conduction whenever the resistance of sensor 10 decreases.

The drain current of a field effect transistor is determined by its gate-to-source potential. The gate-to-source bias of field effect transistor Q3 is equal to the voltage on the gate electrode 56 minus the voltage across the sensor 10. Since the voltage across sensor 10 should remain constant, the required change in bias voltage for transistor Q3 is supplied by amplifier A2. This is accomplished by applying the voltage across sensor 10 to the amplifier A2 through the amplifier A1. Amplifier A1 serves as a buffer amplifier to isolate the impedance of the sensor 10 from the low pass filter network 16.

Figure 4:
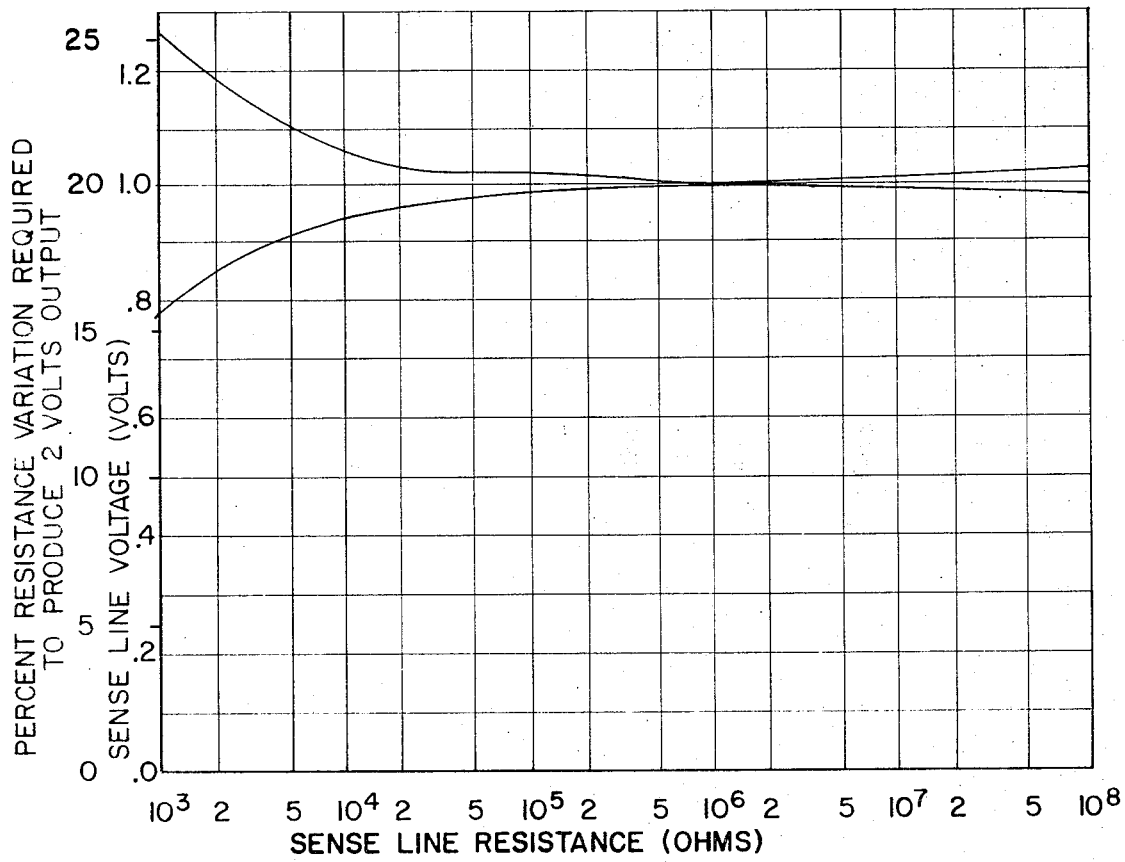
FIG. 4 is a curve showing certain performance characteristics of the invention.

Thus, the amplifiers A1, A2 and A3 make up a closed loop system with the voltage across the sensor 10 being the maintained condition, and any deviation from its nominal voltage value provides an error signal that is amplified and fed back to the gate 56 of amplifier A3. The control loop maintains a relatively constant potential across the sensor 10 for resistance values varying from 1,000 ohms to 100 megohms as shown in FIG. 4.

While the system operates to desensitize itself with respect to low frequency changes in the resistance of the sensor, it must be capable of detecting rapid changes caused by a transient disturbance, i.e., change having a frequency range of 1 to 10 hz. To detect a transient disturbance in the sensor 10, the control loop of amplifiers A1, A2 and A3 must be temporarily disabled, and this is accomplished by the capacitor 22 connected between the gate and source electrodes 56 and 62 of transistor Q3 in conjunction with the low pass filter 16. Under steady state conditions capacitor 22 is charged to a value equal to the gate-to-source potential of transistor Q3. A transient, or sudden, change in the resistance of sensor 10, due to a transient disturbance, will cause a corresponding voltage change across the sensor 10 since the gate-to-source bias of transistor Q3 will be maintained by capacitor 22 for a predetermined period of time, and therefore the current supplied to sensor 10 will not immediately change, and a voltage change will be developed. This voltage change is applied through the active notch filter 14 including the amplifier A4.

After the predetermined period of time determined by the charging rate of capacitor 22, the voltage across sensor 10 will return to its nominal value due to the action of the closed loop system made up of the amplifiers A1, A2 and A3. The length of time required for the voltage across sensor 10 to recover to its nominal value determines the minimum rate of change that will produce a signal to be processed by the amplifier A4 and the utilization circuit. Since the current during the desensitized period of the amplifier remains constant, it follows that the percentage resistance change required to produce a certain output will be inversely proportional to the voltage regulation curve as shown in FIG. 4.

The amplifier A4 comprises a field effect transistor Q4 having a drain electrode 64 connected to the +V voltage supply terminal 36, a source electrode 66 connected to ground through a resistor 68, a gate electrode 70 directly connected to the drain electrode 64 and a gate electrode 72.

The passive circuitry 14 of the active notch filter is connected between the sensor 10 and the gate electrode 72 and it includes serially connected resistors 74 and 76, the junction of which is grounded through a capacitor 78. Serially connected capacitors 80 and 82 are connected in parallel with the resistors 74 and 76. The junction of capacitors 80 and 82 is connected to the source electrode 66 through a resistor 84 which provides a feedback path from the amplifier to the filter.

The transistor Q4 operates as a source follower with its output voltage being developed across the resistor 68. The voltage across resistor 68 is applied through a coupling capacitor 86 to the gate 88 of a field effect transistor Q5. The source electrode 90 and substrate 92 of transistor Q5 are connected to ground through the resistor 26 by-passed by the capacitor 28. The drain electrode 94 is connected through the +V voltage supply terminal 36 through a filter 95 comprising a parallel connected resistor 96 and capacitor 98. Bias for the gate electrode 88 is supplied by a voltage divider consisting of resistors 100 and 102 connected between the voltage supply and ground. The output from the drain electrode is coupled to a utilization circuit through a capacitor 104.

The Embodiment of FIG. 2

The embodiment of FIG. 2 is very similar to that of FIG. 1 but includes several modifications. The first modification is the substitution for the diode 52 of a resistor 112 between the drain electrode 50 of amplifier A2 and the +V voltage supply terminal 36 and the connection of a diode 114 between the drain electrode 50 and the gate electrode 56 of amplifier A3. The substitution of the resistor 112 for the diode 52 is an improvement to the FIG. 1 embodiment in that it eliminates the criticality of the transistor Q2 which is required to control nanoamperes of current. The resistor 112 is a resistor of fixed value, approximately 10 megohms, a value which is not critical but needs only be low enough to make the control current a reasonable value. The reverse biased diode 114 is the equivalent of a very high value resistance in the order of 100 megohms.

Secondly, in FIG. 1 the output from the control loop is taken from across the resistance sensor 10. In FIG. 2 the output is taken from the source electrode 30 of transistor Q1. This is an improvement over the embodiment of FIG. 1 in that the transistor Q4 is entirely eliminated since the transistor Q5 performs its active filter function.

Thirdly, there is a difference between the filter network of FIG. 1 and FIG. 2. In the embodiment of FIG. 1 the filter 14 and amplifier A4 are an active notch filter. The filter 116 and amplifier A5 in FIG. 5 are an active low pass filter comprising series connected resistors 118 and 120 coupled to the gate electrode 88 of transistor Q5 through a capacitor 122, and a capacitor 124 connected to ground from between the junction of resistor 120 and capacitor 122. A feedback capacitor 126 is connected between the source electrode 90 and substrate 92 and the junction of resistors 118 and 120.

Design Factors

The charge time of capacitor 22 in the FIG. 1 configuration is determined primarily by the following equation:

charge time $= C(R_B + R_s)/(1 + K_1 K_2)$ where $R_s$ = resistance of sensor 10
$K_1$ = voltage gain of amplifier A1
$K_2$ = voltage gain of amplifier A2
$C$ = capacitance of capacitor 22
$R_B$ = Q3 gate bias resistance Since the charging rate is affected by the voltage gains of amplifiers A1 and A2, low pass filter 16 is used to decouple the feedback loop for transient changes in resistance $R_s$ occurring at a frequency greater than the low frequency response of the system. The charge time under these conditions simplifies to $C(R_B + R_s)$. If this charge time is much greater than the lowest frequency resulting from the change in resistance $R_s$ that it is desirable to detect, these changes will be authentically translated to equivalent voltage signals.

The value of $R_B$ should be large compared to $R_s$ in order to keep the value of $R_s$ from affecting the low frequency response of the system. Since it is desirable to operate with value of $R_s$ in the range of $10^8$ ohms, it is necessary that $R_B$ be at least $10^9$ ohms. In addition, if the value of $R_B$ must be at least $10^9$ ohms, the gate resistance of Q3 must be even higher. Therefore, a MOSFET type field effect transistor with a typical gate input impedance of $10^{12}$ ohms is used for transistor Q3.

With respect to the embodiment of FIG. 2, for decreases in the value of sensor 10, the charge time of capacitor 22 is a function of the reverse resistance of the diode 114 and therefore functions the same as the circuit of FIG. 1, but eliminates the problem of controlling nanoamperes of current with an active device. For transient increases in the resistance of sensor 10, the diode 114 operates as a forward biased diode and the charge time becomes a function of the resistance of the resistor 112 and the sensor 10. This time is shorter than the period of the highest frequency signal it is desired to detect and signal is therefore greatly attenuated.

The bias network for transistor Q3 is a voltage divider network comprised of the reverse bias resistance of diode 52 and the drain to source resistance of transistor Q2. The reverse bias resistance of diode 52 is approximately $10^{10}$ ohms. Since transistor Q2 is acting as a constant current source, its effective drain to source resistance will also be of the same magnitude.

There are significant ground currents in populated areas and these currents could have frequencies which are typically 50, 60 and 400 hertz. The disclosed sensors are designed to operate in the one hertz to 10 hertz band pass. Filter 14 including amplifier A4 (FIG. 1) is an active notch filter which serves to attenuate greatly frequencies from 50 to 60 hertz. Filter 116 including amplifier A5 (FIG. 2) is an active low pass filter designed to provide 20 db attenuation for 50 hertz. The filter 116 has the advantage over the notch type filter 14 of FIG. 1 in that it provides a sharper cutoff at the upper end of the sensor intelligence band and is less critical of component tolerances. The combination of a high pass filter in the regulator and active and passive low pass filters in the amplifier creates a band pass which converts an input signal of adequate steepness into a pulsed output signal comprising frequencies between 1 and 10 hertz. This arrangement emphasizes the frequency band characteristic of an intrusion while attenuating frequencies generated by wind, rain, snow and earth currents, thus greatly minimizing false alarms.

Although the bandpass characteristics and attenuation factors of the active filters used in FIGS. 1 and 2 could be achieved with passive filters, there would be a considerable loss of signal in the pass band and this would require extensive amplification following the filters. Additional high frequency attenuation is provided by the amplifier A5 and the low pass filter 95. As noted earlier, the active filter, as shown in FIG. 2, also incorporates amplifier A5. Thus, I have utilized the capability of an active filter to provide no attenuation in the pass band, and in addition I have obtained amplification of the signal after filtering using the same active element as used to implement the active filter. The significant consequence of this is that one stage of amplification is saved over and above the savings made possible by the use of active rather than passive filters.

In this sensor application, current drain is a premium consideration since the system may be used as a portable device. The elimination of one amplifier stage saves approximately 30 percent of the total device current drain and therefore reduces the required battery size or prolongs the battery life.

Circuit Parameters

Although this invention is not limited to particular circuit parameters, the following parameters were used in the embodiments of this invention illustrated in FIGS. 1 and 2:

Transistors

-Continued

| | |
|---|---|
| Q1 | Type MPF120 |
| Q2 | Type 2N4351 |
| Q3 | Type 2N4351 |
| Q4 | (Figure 1) Type MPF120 |
| Q5 | Type 2N4351 |
| Resistors | |
| 18 | 15 megohms |
| 26 | 22 kilohms |
| 32 | 1 megohm |
| 46 | 1 megohm |
| 48 | (Figure 1) 1.5 megohms |
| 48 | (Figure 2) 5.6 megohms |
| 60 | 270 ohms |
| 68 | (Figure 1) 330 kilohms |
| 74 | (Figure 1) 5.6 megohms |
| 76 | (Figure 1) 5.6 megohms |
| 84 | (Figure 1) 2.7 megohms |
| 96 | 100 kilohms |
| 100 | (Figure 1) 2.2 megohms |
| 100 | (Figure 2) 15 megohms |
| 102 | (Figure 1) 1 megohm |
| 102 | (Figure 2) 10 megohms |
| 112 | (Figure 2) 10 megohms |
| 118 | (Figure 2) 1.5 megohms |
| 120 | (Figure 2) 1.5 megohms |
| Diodes | |
| 52 | (Figure 1) Type 1N914 |
| 114 | (Figure 2) Type 1N914 |
| Capacitors | |
| 20 | .03 uf |
| 22 | .0027 uf |
| 28 | (Figure 1) 10 uf |
| 78 | (Figure 1) .001 uf |
| 80 | (Figure 1) .0005 uf |
| 82 | (Figure 1) .0005 uf |
| 86 | (Figure 1) .1 uf |
| 98 | .1 uf |
| 104 | 1.5 uf |
| 122 | (Figure 2) .1 uf |
| 124 | (Figure 2) .02 uf |
| 126 | (Figure 2) .01 uf |

While the various embodiments of this invention utilize field effect transistors, it will be understood that other types of transistors or even vacuum tubes may be used, and it will be understood that any variable impedance device having an input electrode, an output electrode and a control electrode may be used provided it has the appropriate characteristics.

The disclosed sensor systems will have the following advantages over prior art devices including those described by Dalton:

1. Sensitivity of the device (expressed as voltage output for a fixed percentage resistance change) will be substantially independent of the initial resistance.
2. The device is most sensitive in the frequency range which is characteristic of the effects of an intrusion attempt.
3. The device is least sensitive in the frequency ranges where spurious signals are anticipated above and below the selected frequency range.

These advantages enhance the possibility of intrusion detection, and minimize the chances of false alarms.

I claim:

1. In a system for detecting a sudden physical intrusion into an area, the combination comprising:
a bare wire sensor in conductive contact with a reference surface in said area;
a source of direct voltage;
a first variable impedance device having an input electrode, an output electrode and a control electrode, said input and output electrodes being connected across said source, said sensor being coupled between said input and control electrodes; and
servo means for maintaining a substantially constant voltage across said sensor except upon the occurrence of a sudden intrusion producing a rapid change in contact pressure between said sensor and said surface, said servo means comprising a second variable impedance device having an input electrode, an output electrode and a control electrode, said input and output electrodes of said second variable impedance device being connected in series with said sensor and said source, said servo means including low frequency responsive means coupled between said control electrode of said second variable impedance device and said sensor, the voltage applied to said control electrode changing the current flow through said variable impedance device and said sensor in inverse proportion to gradual changes in the resistance of said sensor.

2. The invention as defined in claim 1 wherein said low frequency responsive means is a low pass filter for permitting the coupling of slowly changing voltages across said sensor.

3. The invention as defined in claim 2, and means for disabling said servo means upon the occurrence of a sudden change in the impedance of said sensor.

4. The invention as defined in claim 3 wherein said means for disabling said servo means comprises a capacitor connected between the control and input terminals of said second variable impedance device for maintaining the voltage across said second variable impedance device substantially constant for a predetermined period of time.

5. The invention as defined in claim 1 wherein the coupling between said sensor and the control and input electrodes of said first variable impedance device is an active filter.

6. The invention as defined in claim 5 wherein said filter passes frequencies produced by sudden changes in the contact impedance of said sensor.

7. The invention as defined in claim 6 wherein said low frequency responsive means is a low pass filter for permitting the coupling of slowly changing voltages across said sensor.

8. The invention as defined in claim 7, and means for disabling said servo means upon the occurrence of a sudden change in the impedance of said sensor.

9. The invention as defined in claim 8 wherein said means for disabling said servo means comprises a capacitor connected between the control and input terminals of said second variable impedance device for maintaining the voltage across said second variable impedance device constant for a predetermined period of time.

10. The invention as defined in claim 1 wherein said servo means comprises: a third variable impedance device having an input electrode, an output electrode and a control electrode, said sensor being connected across said control and input electrodes of said third variable impedance device, said input and output electrodes being connected across said source; a fourth variable impedance device having input, output and control electrodes, the voltage changes resulting from the change in impedance of said third variable impedance device being coupled to the control electrode of said fourth variable impedance device through said low frequency responsive means, said input and output electrodes of said fourth variable impedance device being connected across said source, the voltage variations due to the variation in said fourth variable impedance device being coupled to the control electrode of said second variable impedance device; and a capacitor connected between the control and input electrodes of said second variable impedance device.

11. The invention as defined in claim 9 wherein said first and second variable impedance devices are each field effect transistors and wherein said control, input and output electrodes are gate, source and drain electrodes, respectively.

12. The invention as defined in claim 6 wherein said low frequency responsive means is a notch filter for permitting the coupling of slowly changing voltages while attenuating the effects of alternating ground currents.

* * * * *